(12) United States Patent
Zhao et al.

(10) Patent No.: US 11,766,638 B2
(45) Date of Patent: *Sep. 26, 2023

(54) ION-EXCHANGE MEMBRANE HAVING AN IMPRINTED NON-WOVEN SUBSTRATE

(71) Applicant: BL Technologies, Inc., Minnetonka, MN (US)

(72) Inventors: Yonghong Zhao, Singapore (SG); John H. Barber, Guelph (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/462,545

(22) Filed: Aug. 31, 2021

(65) Prior Publication Data
US 2021/0394121 A1 Dec. 23, 2021

Related U.S. Application Data

(63) Continuation of application No. 16/495,323, filed as application No. PCT/US2017/023214 on Mar. 20, 2017, now Pat. No. 11,135,551.

(51) Int. Cl.
B01D 61/50 (2006.01)
B01D 69/10 (2006.01)
B01D 71/42 (2006.01)
B01D 71/48 (2006.01)
B01D 71/56 (2006.01)

(52) U.S. Cl.
CPC ........... B01D 61/50 (2013.01); B01D 69/105 (2013.01); B01D 71/42 (2013.01); B01D 71/48 (2013.01); B01D 71/56 (2013.01); B01D 2323/46 (2013.01); B01D 2325/42 (2013.01)

(58) Field of Classification Search
CPC ...... B01D 61/50; B01D 69/105; B01D 71/42; B01D 71/48; B01D 71/56; B01D 2323/46; B01D 2325/42
USPC .......................................................... 204/600
See application file for complete search history.

(56) References Cited

U.S. PATENT DOCUMENTS

| 3,356,607 A | 12/1967 | Eisenmann et al. |
| 4,505,797 A | 3/1985 | Hodgdon et al. |
| 10,035,105 B2 * | 7/2018 | Bhikhi ................. B01D 63/081 |

(Continued)

FOREIGN PATENT DOCUMENTS

| CN | 1027696 C | 2/1995 |
| CN | 1217004 A | 5/1999 |

(Continued)

OTHER PUBLICATIONS

Chinese Patent Application No. 201780090997.6, Office Action dated Jul. 18, 2022.

(Continued)

Primary Examiner — Michael M. Bernshteyn

(57) ABSTRACT

The present disclosure provides an ion-exchange membrane that includes a supporting substrate impregnated with an ion-exchange material. The supporting substrate includes an imprinted non-woven layer, and the imprinting includes a plurality of deformations at a surface density of at least 16 per $cm^2$. The supporting substrate may lack a reinforcing layer. In some examples, the supporting substrate may include only a single layer of the imprinted non-woven fabric.

19 Claims, 3 Drawing Sheets

(56) References Cited

U.S. PATENT DOCUMENTS

| | | | |
|---|---|---|---|
| 10,486,151 B2* | 11/2019 | Barber | B01D 69/141 |
| 11,135,551 B2* | 10/2021 | Zhao | B01D 71/42 |
| 2009/0120788 A1* | 5/2009 | Kashiwada | H01M 8/1067 |
| | | | 156/212 |
| 2013/0017416 A1* | 1/2013 | Goeting | B01D 61/50 |
| | | | 204/627 |
| 2013/0052563 A1 | 2/2013 | Sharman et al. | |
| 2013/0146450 A1 | 6/2013 | Kishino et al. | |
| 2015/0291452 A1 | 10/2015 | Jikihara et al. | |
| 2017/0007965 A1 | 1/2017 | Van Berchum et al. | |

FOREIGN PATENT DOCUMENTS

| | | | | |
|---|---|---|---|---|
| CN | 1399359 | A | | 2/2003 |
| CN | 101035927 | A | | 9/2007 |
| CN | 103068473 | A | | 4/2013 |
| CN | 103623712 | A | | 3/2014 |
| CN | 103781810 | A | | 5/2014 |
| CN | 103857730 | A | | 6/2014 |
| CN | 103993329 | A | | 8/2014 |
| CN | 104759208 | A | | 7/2015 |
| CN | 102844097 | B | | 2/2016 |
| CN | 106061588 | A | | 10/2016 |
| EP | 3040365 | A1 | | 7/2016 |
| JP | S59102404 | A | | 6/1984 |
| JP | S59179625 | A | | 10/1984 |
| JP | S62253632 | A | | 11/1987 |
| JP | 2005520002 | A | | 7/2005 |
| JP | 2012149174 | A | | 8/2012 |
| JP | 2012149174 | A | * | 8/2012 |
| JP | 2012149274 | A | * | 8/2012 ............ C08L 83/00 |
| JP | 2013528478 | A | | 7/2013 |
| JP | 2014201612 | A | | 10/2014 |
| KR | 101330571 | B1 | * | 11/2013 |
| WO | 03022912 | A3 | | 9/2004 |
| WO | 2010047360 | A1 | | 4/2010 |
| WO | 2011126363 | A1 | | 10/2011 |
| WO | WO-2011126363 | A1 | * | 10/2011 ............ B01D 61/50 |
| WO | 2012023451 | A1 | | 2/2012 |
| WO | 2013129399 | A1 | | 9/2013 |
| WO | 2014039171 | A2 | | 3/2014 |
| WO | 2014103819 | A1 | | 7/2014 |
| WO | 2014129399 | A1 | | 8/2014 |
| WO | 2015128631 | A1 | | 9/2015 |
| WO | WO-2015128631 | A1 | * | 9/2015 ............ B01D 61/50 |
| WO | 2016141550 | A1 | | 9/2016 |
| WO | WO-2016141550 | A1 | * | 9/2016 ........... B01D 61/422 |

OTHER PUBLICATIONS

European Patent Application No. 17714627.1, European Office Action dated Aug. 23, 2022.
Japanese Patent Application No. JP20190551667, Office Action dated Jul. 25, 2022.
Chinese Patent Application No. 201580077613.8, Office Action dated Oct. 9, 2018.
Chinese Patent Application No. 201780090997.6, Office Action dated Feb. 7, 2022.
Chinese Patent Application No. 201780090997.6, Office Action dated Jul. 13, 2021.
Chinese Patent Application No. CN201580077613.8, Office Action dated Jul. 2, 2019.
European Application No. 17714627.1, Communication pursuant to Article 94(3), dated Aug. 18, 2021.
European Application No. 17714627.1, Communication pursuant to Article 94(3), dated Sep. 7, 2020.
European Patent Application No. 17714627.1, Communication pursuant to Rules 161(1) and 162 EPC dated Oct. 29, 2019.
European Patent Application No. 15884233.6, Partial Supplementary European Search Report dated Oct. 19, 2018.
International Patent Application No. PCT/US2017/023214, International Preliminary Reporton Patentability and Writter Opinion dated Sep. 24, 2019.
International Patent Application No. PCT/US2017/023214, International Search Report and Written Opinion dated Nov. 20, 2017.
International Patent Application No. PCT/CN2015/073947, International Preliminary Report on Patentability dated Sep. 21, 2017.
International Patent Application No. PCT/CN2015/073947, International Search Report and Written Opinion dated Dec. 10, 2015.
Japanese Patent Application No. JP20190551667, Office Action dated Apr. 6, 2021—English Translation available.
Japanese Patent Application No. 2017-545943, Office Action dated Nov. 27, 2018—English Translation Available.
Japanese Patent Application No. JP2019551667, Office Action dated Dec. 21, 2021—English Translation available.
Taiwan Patent Application No. 105105492, Office Action and Search Report dated Sep. 6, 2019.
U.S. Appl. No. 15/556,735, Non-Final Office Action dated Mar. 27, 2019.
U.S. Appl. No. 15/556,735, Notice of Allowance dated Jul. 15, 2019.
U.S. Appl. No. 16/495,323, Non-Final Office Action dated Jan. 25, 2021.
U.S. Appl. No. 16/495,323, Notice of Allowance dated Jun. 16, 2021.
U.S. Appl. No. 15/556,735, Notice of Allowance dated Oct. 12, 2018.
U.S. Appl. No. 16/495,323, Notice of Allowance dated Aug. 24, 2021.
U.S. Appl. No. 16/495,323, Notice of Allowance dated Aug. 27, 2021.
Canadian Patent Application No. 3,057,069, Office Action dated Nov. 16, 2022.

* cited by examiner

ION-EXCHANGE MEMBRANE HAVING AN IMPRINTED NON-WOVEN SUBSTRATE

CROSS-REFERENCE TO RELATED APPLICATIONS

This application is a continuation of U.S. patent application Ser. No. 16/495,323, filed Sep. 18, 2019, which is a National Stage Entry of International Application No. PCT/US2017/023214, filed Mar. 20, 2017. U.S. patent application Ser. No. 16/495,323 and International Application No. PCT/US2017/023214 are incorporated herein by reference.

FIELD

The present disclosure relates to ion-exchange membranes with a non-woven layer.

BACKGROUND

The following paragraphs are not an admission that anything discussed in them is prior art or part of the knowledge of persons skilled in the art.

Ion-exchange membranes are used as electrolytic membranes for electrodialysis (ED), bipolar ED, reversed electrodialysis (RED), electrodeionization (EDI), and electrodialysis reversal (EDR). These purification processes transport ions from one solution to another solution through the ion-exchange membrane under the influence of an applied electric potential difference.

Ion-exchange membranes useful for electrodialysis include an ion-exchange material and a supporting substrate for the ion-exchange material. In ion-exchange membranes produced using a woven or non-woven fabric sheet as the supporting substrate, voids in the woven or non-woven fabric sheet are filled with the ion-exchange material.

INTRODUCTION

The following introduction is intended to introduce the reader to this specification but not to define any invention. One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

Using non-woven fabric in ion-exchange membranes is desirable as the highly interlaced structure of fibers in non-woven fabric may reduce leaking, electrical resistance, thickness, or any combination thereof, in comparison to membranes formed using woven fabrics. However, a membrane formed only using non-woven fabric often has an undesirable physical property when compared to membranes formed using woven fabrics. The undesirable physical property may be reduced strength, reduced dimensional stability, or reduced shape stability. For example, a membrane formed with a single layer of non-woven substrate may curl on curing of the ion-exchange polymer at an elevated temperature.

In order to improve at least one of the undesirable physical properties, ion-exchange membranes made with non-woven fabrics may include a reinforcing layer. However, the addition of a reinforcing layer increases the thickness of the membrane and, as a result, the resistance of the membrane also increases.

Reducing the thickness of an ion-exchange membrane is desirable as such reduction may result in higher throughput from an electrolytic cell stack, all other conditions being equal, since more membranes may be loaded into the same device. Reducing the thickness of the ion-exchange membranes may result in a reduction of chemicals consumed for a given area of membrane since thinner membranes have less ion-exchange material per surface area of membrane. Reducing the thickness of the ion-exchange membranes may result in a reduction of energy consumption in an electrolytic purification process if it corresponds with a reduction in resistance of the thinner membranes.

Ion-exchange membranes having a reinforcing layer attached to a non-woven fabric layer may also expand irregularly when in salt solutions, which results in undulation of the membranes. The irregular expansion is due to the differences in expansion, or contraction, of the two layers when in the salt solution.

Therefore, there remains a need for an ion-exchange membrane with a non-woven layer that addresses or ameliorates one or more shortcomings associated with an ion-exchange membrane formed from a single layer of non-woven fabric, or with an ion-exchange membrane formed from a non-woven fabric and a reinforcing layer.

In some examples, the present disclosure provides an ion-exchange membrane having a supporting substrate impregnated with an ion-exchange material. The supporting substrate includes an imprinted non-woven layer, where the imprinting includes a plurality of deformations at a surface density of at least 16 per $cm^2$. The imprinting may be debossing, embossing, or a combination thereof.

In some examples, the present disclosure provides a method of making an ion-exchange membrane. The method includes saturating or impregnating a supporting substrate with a solution that includes an anionic or cationic monomer and a crosslinker; and polymerizing the monomer and crosslinker at an elevated temperature. The supporting substrate includes an imprinted non-woven layer, where the imprinting includes a plurality of deformations at a surface density of at least 16 per $cm^2$. The imprinting may be debossing, embossing, or a combination thereof.

BRIEF DESCRIPTION OF THE DRAWINGS

Embodiments of the present disclosure will now be described, by way of example only, with reference to the attached Figures.

DETAILED DESCRIPTION

Figure 1:
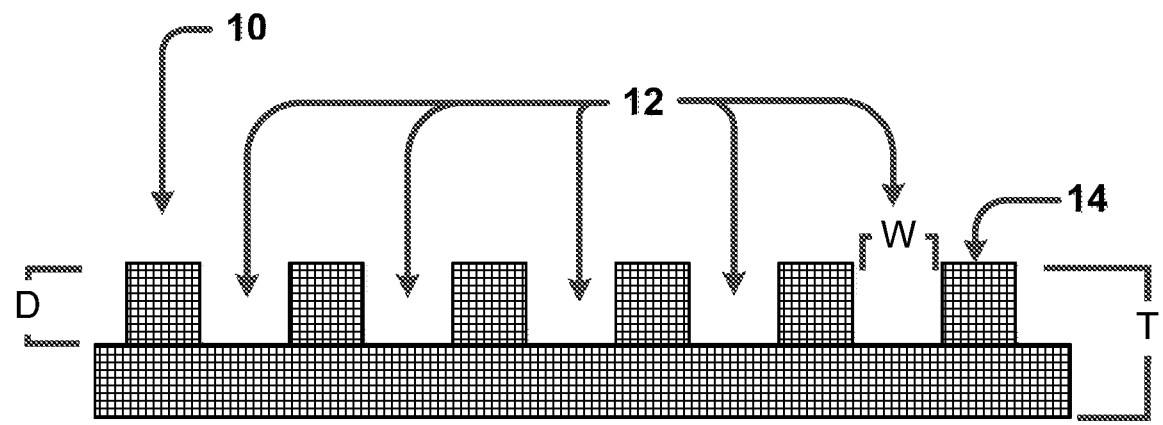
FIG. 1 is an illustration of an exemplary debossed non-woven layer having depressions into the surface of the fabric.

Generally, the present disclosure provides an ion-exchange membrane that includes a supporting substrate impregnated with an ion-exchange material. The supporting substrate includes an imprinted non-woven layer, and the imprinting includes a plurality of deformations at a surface density of at least 16 per cm². The imprinting may be debossing, embossing, or a combination thereof. In some examples, the imprinted non-woven fabric may have physical properties that allow the supporting substrate to exclude a reinforcing layer. In some examples, the imprinted non-woven fabric may have physical properties that allow the supporting substrate to include only a single layer of the imprinted non-woven fabric.

Ion-exchange membranes formed with such an imprinted non-woven layer may have improved dimensional stability or shape stability during membrane curing at elevated temperature in comparison to membranes that are otherwise identical but lack the imprinting. For example, an ion-exchange membrane according to the present disclosure may be smoother, flatter and/or have fewer wrinkles than an otherwise identical ion-exchange membrane that has a deformation-free non-woven layer. Without wishing to be bound by theory, the authors of the present disclosure believe that the deformations in the non-woven layer inhibit or terminate the development of distortions in long fibres of the non-woven layer, in particular when the non-woven layer is impregnated or saturated with the ion-exchange components and cured at an elevated temperature.

In the context of the present disclosure, "debossing" refers to imprinting a design into a material and leaving a depressed imprint of the design in the surface of the material. The depressed imprint is also referred to as the "debossed" imprint. A layer of fabric that has been subjected to a debossing step may be referred to as a "debossed fabric". The expression "embossing" refers to imprinting a design into a material and leaving a raised imprint of the design in the material. The raised imprint is also referred to as the "embossed" imprint. A layer of fabric that has been subjected to an embossing step may be referred to as an "embossed fabric".

The imprinted non-woven layer may have at least 30, at least 50, or at least 100 deformations per cm². The imprinted non-woven layer may have no more than 200 deformations per cm². It should be understood that the present disclosure contemplates all imprinted non-woven layers having from 16 to 200 deformations per cm², and contemplates all possible ranges encompassed by 16 to 200 deformations per cm².

The deformations in the non-woven layer may make up from about 10% to about 90% of the surface area of the imprinted non-woven layer. This may be calculated by viewing the non-woven layer from above, measuring the total visible area of the deformations, and dividing by the total surface area. For example, in a square centimeter of non-woven fabric having 16 deformations that are each 2×2 mm square, the deformations would make up 64% of the surface area.

In some examples, the deformations in the imprinted non-woven layer may be depressions in the surface of the fabric, as illustrated in FIG. 1, which illustrates a cross-section of a debossed fabric. Fabric (10) includes deformations that are depressions (12) in the surface of the fabric (14). In this exemplary fabric, the thickness of the debossed non-woven layer is illustrated as (T), the depth of the depressions (12) is illustrated as (D). The surface area of the exemplary depressions may be calculated at least partially based on dimension W. For example, if the depressions (12) are square-shaped, then the area of a deformation would be $W^2$.

Figure 2:
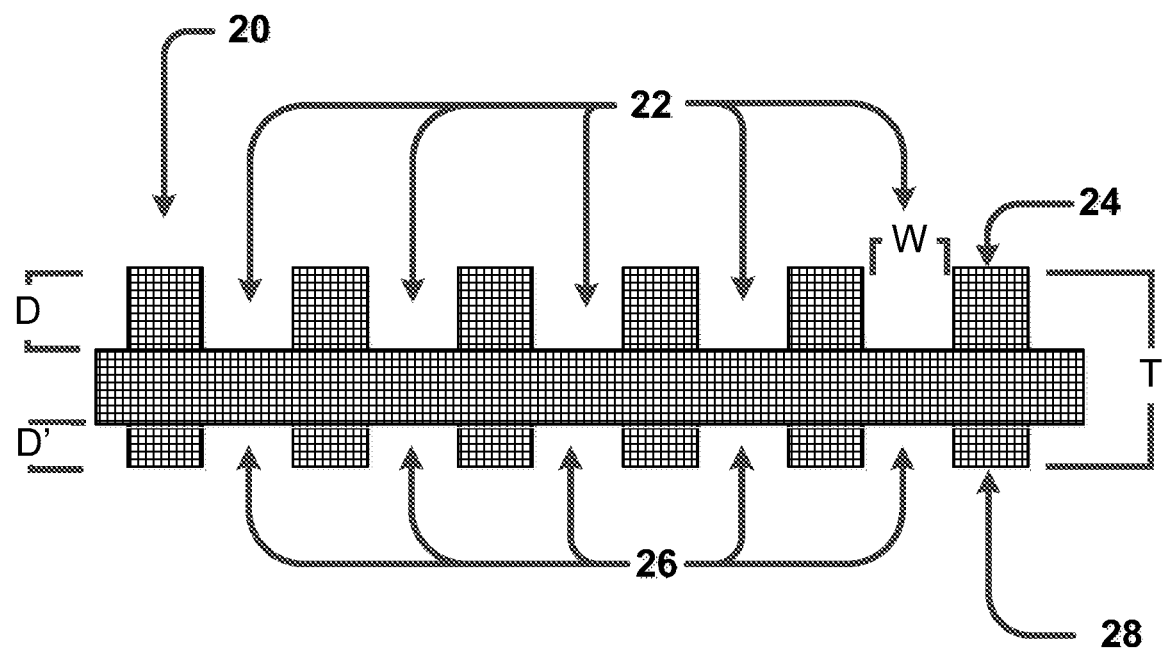
FIG. 2 is an illustration of an exemplary debossed non-woven layer having depressions into the surface of the fabric and reciprocal depressions in the opposite surface of the fabric.

In other examples, the deformations in the imprinted non-woven layer may be depressions in the surface of the fabric with reciprocal depressions in the opposite surface of the fabric, as illustrated in FIG. 2. Fabric (20) includes deformations that are depressions (22) in the surface of the fabric (24). The depressions (22) have reciprocal depressions (26) in the opposite surface of the fabric (28). In this exemplary fabric, the thickness of the debossed non-woven layer is illustrated as (T), the depth of the depressions (22) is illustrated as (D), and the depth of the opposite depressions (26) is illustrated as (D'). The surface area of the exemplary depressions may be calculated at least partially based on dimension W. As illustrated in FIG. 2, depth "D" is not identical to depth "D'". That is, the depth of the reciprocal depressions into the opposite surfaces do not need to be identical. A debossed non-woven layer according to the present disclosure, but not illustrated in the figures, may include depressions in opposite surfaces of the fabric, though the depressions do not have reciprocal depressions in the opposite surface.

Using a fabric as illustrated in FIG. 1 or 2 as a support in an ion-exchange membrane would result in ion-exchange polymer both (a) in the debossed depressions, and (b) impregnated in voids of the fibers of the non-woven fabric.

The debossed non-woven layer may be from about 50 μm to about 700 μm thick. Using a debossed non-woven layer having a thickness from about 100 μm to about 300 μm may provide a beneficial balance between electrical resistance, mechanical strength, and shape stability. The deformations may have an average total depth, as measured from a non-debossed portion of the surface of the non-woven layer, that is 5-99% of the thickness of the debossed non-woven layer. In particular examples, the average total depth may be from 40-60% of the thickness of the debossed non-woven layer. In the context of the debossing illustrated in FIG. 1, this corresponds to depth "D" being from 5% to 99% of the thickness "T". In the context of the debossing illustrated in FIG. 2, this corresponds to the total of depth "D" plus depth "D'" being from 5% to 99% of the thickness "T".

For example, the debossed non-woven layer may be 50 μm thick, and have depressions into only one surface of the non-woven layer, where the depressions have an average depth of 25 μm, corresponding to 50% of the thickness of the debossed non-woven layer. In another example, the debossed non-woven layer may have depressions into both surfaces of the non-woven layer, where the depression have an average depth of 50 μm from one surface and 25 μm from the opposite surface. If the debossed non-woven layer is 100 μm thick the depressions represent 75% of the total thickness of the layer.

Figure 3:
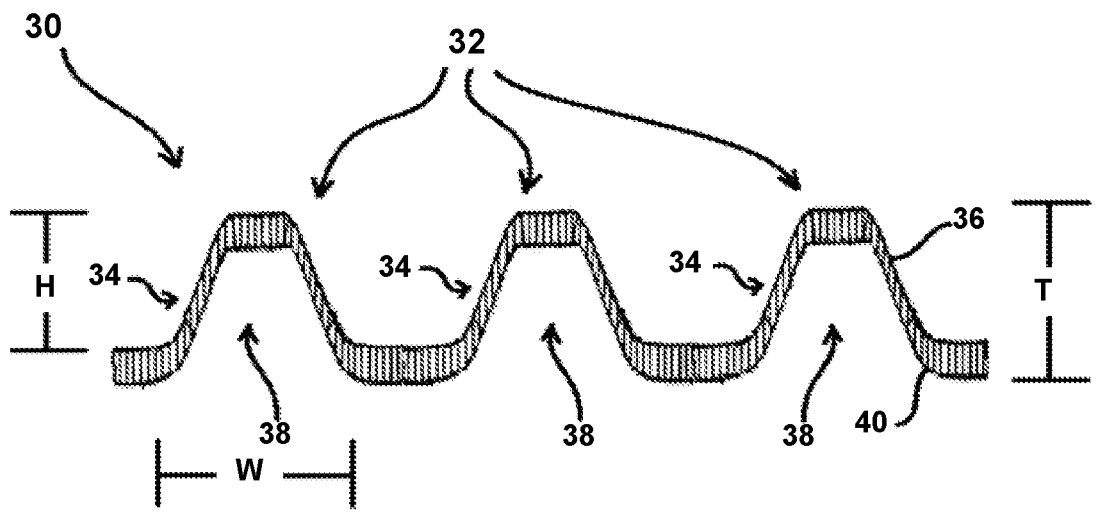
FIG. 3 is an illustration of an exemplary embossed non-woven layer having protrusions from the surface of the fabric and corresponding depressions in the opposite surface of the fabric.

In still other examples, the deformations in the imprinted non-woven layer may be protrusions from only one surface of the fabric with corresponding depressions in the opposite surface of the embossed fabric, as illustrated in FIG. 3. Fabric (30) includes deformations (32) that are protrusions (34) from the surface of the fabric (36). The protrusions (34) have corresponding depressions (38) in the opposite surface of the fabric (40). In this exemplary fabric, the total thickness of the embossed non-woven layer is illustrated as (T) and the height of the protrusions is illustrated as (H). The surface area of the exemplary protrusions may be calculated at least partially based on dimension W.

Figure 4:
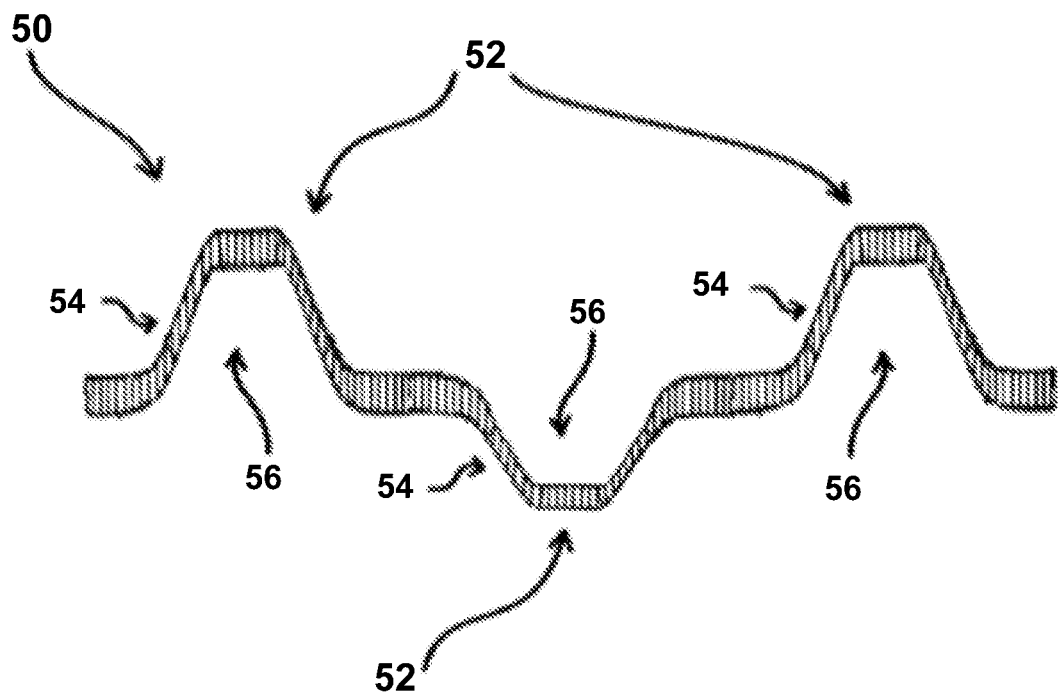
FIG. 4 is an illustration of an exemplary embossed non-woven layer having protrusions from both surfaces of the fabric.

An exemplary imprinted non-woven layer having protrusions on both surfaces is illustrated in FIG. 4. Fabric (50) includes deformations (52) that are protrusions (54) on both surfaces of the fabric. The protrusions (54) have corresponding depressions (56) in the opposite surfaces.

Using a fabric as illustrated in FIG. 3 or 4 as a support in an ion-exchange membrane would result in ion-exchange polymer (a) in the depressions opposite the embossed protrusions, and (b) impregnated in voids of the fibers of the non-woven fabric. In some examples, such as fabrics having closely spaced embossed deformations, the ion-exchange polymer may also be in the space between the protrusions. It would be beneficial for the ion-exchange polymer to be in the space between the protrusions because the corresponding ion-exchange membrane would have a smoother surface. An ion-exchange membrane having ion-exchange polymer only in the depressions opposite the embossed protrusions and impregnated in voids of the fibers may be more easily damaged because the protrusions would be brittle and not protected by any surrounding ion-exchange polymer.

The embossed non-woven layer may be from about 50 μm to about 1000 μm thick, including the height of the deformations. Using an embossed non-woven layer having a total thickness from about 100 μm to about 300 μm may provide a beneficial balance between electrical resistance, mechanical strength, and shape stability. The deformations may have an average height, as measured from a non-embossed portion of the surface of the non-woven layer, that is 5-99% of the total thickness of the embossed non-woven layer.

In particular examples, the average height of the embossed protrusions may be from 40-60% of the total thickness of the embossed non-woven layer. For example, the embossed non-woven layer may be 50 μm thick (not taking the height of the protrusions into account), and have protrusions on only one surface of the layer (such as illustrated in FIG. 3), where the protrusions have an average height of 50 μm. The total thickness of such an embossed non-woven layer is 100 μm since the total thickness is determined by taking the height of the protrusions into account. In such a non-woven layer, the protrusions represent 50% of the thickness of the layer. In another example, the embossed non-woven layer may have protrusions on both surfaces of the layer (such as illustrated in FIG. 4), where the protrusions have an average height of 50 μm on one surface and 25 μm on the opposite surface. If the embossed non-woven layer is 50 μm thick when not taking the height of the protrusions into account, the total thickness of the embossed non-woven layer is 125 μm since the total height takes the heights of the protrusions on both surfaces into account. In such a layer, the protrusions represent 60% of the total thickness of the layer.

If the density of a non-woven layer does not change, the unit weight of the non-woven layer increases as the thickness of the non-woven layer (not taking the height of any embossed protrusions into account) increases. However, two different non-woven layers may have different densities, in which case the unit weights may be different for the same thickness. The unit weight of the non-woven layer may be from about 10 g/m$^2$ to about 260 g/m$^2$.

The debossed deformations may include depressions into a single surface of the non-woven layer (as illustrated in FIG. 1), or depressions into opposite surfaces of the non-woven layer (as illustrated in FIG. 2). In non-woven layers having depressions into opposite surfaces of the non-woven layer, (a) the debossed non-woven layer may have substantially equal numbers of depressions per cm$^2$ on each side of the opposite surfaces, (b) the depressions may make up substantially the same amount of surface area on each side of the opposite surfaces, (c) the depressions into the opposite surfaces of the debossed non-woven layer may be of substantially the same depth, (d) the depressions into the opposite surfaces of the debossed non-woven layer may be of substantially the same size, (e) the depressions into the opposite surfaces of the debossed non-woven layer may be of substantially the same shape, or (f) any combination thereof.

The embossed deformations may include protrusions from a single surface of the embossed non-woven layer (as illustrated in FIG. 3), or protrusions from opposite surfaces of the embossed non-woven layer (as illustrated in FIG. 4). In non-woven layers having protrusions on opposite surfaces of the non-woven layer, (a) the embossed non-woven layer may have substantially equal numbers of protrusions per cm$^2$ on each side of the opposite surfaces, (b) the deformations may make up substantially the same amount of surface area on each side of the opposite surfaces, (c) the protrusions on the opposite surfaces of the embossed non-woven layer may be of substantially the same height, (d) the protrusions on the opposite surfaces of the embossed non-woven layer may be of substantially the same size, (e) the protrusions on the opposite surfaces of the embossed non-woven layer may be of substantially the same shape, or (f) any combination thereof.

Ion-exchange membranes made with a non-woven layer that has deformations on both sides (as illustrated in FIGS. 2 and 4) may have improved shape stability during membrane curing, such as by reducing curling, in comparison to membranes made with a non-woven layer having deformations into only one side (as illustrated in FIGS. 1 and 3). Shape stability may be further improved when (a) the depths or heights of the deformations are substantially the same on both sides of the non-woven layer, (b) the total surface areas of the deformations are substantially the same on both sides of the non-woven layer, or (c) both. Without wishing to be bound by theory, the authors of the present disclosure believe that the more similar the two sides of the non-woven layer, the less prone the membrane will be to curling during membrane curing.

In the context of the present disclosure, two sets of deformations should be considered to be of substantially the same depth, be of substantially the same height, be of substantially the size, or cover substantially the same surface area if the values are within 10% of the average of the two values. For example, two sets of depressions should be considered to be of substantially the same depth if the depressions in one area of a non-woven layer (such as on one side of the substrate) have an average depth of 110 μm and the depressions in another area of the non-woven layer (such as on the opposite side of the substrate) have an average depth of 90 μm. In this example, the depth of 90 μm and 110 μm fall within ±10% of the 100 μm average. In another example, two sets of depressions into opposite sides of the substrate should be considered to cover substantially the same surface area if the depressions on one side cover 45% of the area and the depressions on the other side cover 55% of the area. In this example, the values of 45% and 55% are both within ±10% of the 50% average.

The deformations in the non-woven layer may have a shape that is: circular, triangular, square-shaped, rectangular, diamond-shaped, star-shaped, oval, or any combination thereof. It is desirable for the deformations to be uniformly distributed across the non-woven layer. "Uniformly distributed" should be understood to mean that the number of deformations in every given square centimeter of the non-woven layer should be within ±10% of the average number of deformations per square centimeter over the whole layer. For example, if the non-woven layer has 100 deformations/cm$^2$, then every square centimeter must have from 90 to 110 deformations in order for the deformations to be considered "uniformly distributed". In some examples of uniformly distributed deformations, the deformations are regularly spaced apart, for example in rows and columns, or in diagonal arrangements.

The non-woven layer may be a non-woven fabric sheet of: polyester, polypropylene, polyethylene, polyamide, polyacrylonitrile, or polyvinyl chloride. Polyester is acid stable and may be used to make a membrane for EDR, such as a membrane that includes a polymer formed from a polymerization that includes: (a) N-trimethylaminoethylmethacrylate chloride (TMAEMC) and ethylene glycol dimethacrylate (EGDM); (b) dimethylaminopropyl methacrylamide (DMAPMA), cyclohexanedimethanol diglycidyl ether (CHDMDGE), HCl and N-vinyl caprolactam (V-Cap); (c) vinyl benzyl chloride (VBC), divinylbenzene (DVB), tributyl amine (TBA), and dibutyl amine (DBA); or (d) 2-acrylamido-2-methylpropane sulfonic acid (AMPS) and EGDM. Polypropylene is base stable and maybe be used to make a membrane for ED, such as a membrane that includes a polymer formed from a polymerization that includes: (a) lithium styrene sulfonate (LiSS) and divinyl benzene (DVB), (b) (vinylbenzyl)trimethylammonium chloride (VBTAC) and DVB; or (c) vinyl benzyl chloride (VBC), divinylbenzene (DVB), tributyl amine (TBA), and dibutyl amine (DBA).

The ion-exchange material may be a cation-exchange polymer having sulfonic acid groups, carboxylic acid groups, phosphoric acid groups, or salts thereof. For example, the cation-exchange polymer may be a polymer formed from the polymerization with 2-acrylamido-2-methylpropane sulfonic acid, sodium 2-acrylamido-2-methylpropane sulfonate, potassium 3-sulfopropyl acrylate, sodium methallyl sulfonate, sodium vinyl sulfonate, sodium 4-vinylbenzenesulfonate, lithium 4-vinylbenzenesulfonate, acrylic acid, 2-ethylacrylic acid, methacrylic acid, 2-propylacrylic acid, sodium acrylate, sodium methacrylate, ethylene glycol methacrylate phosphate, vinylphosphonic acid, or bis[2-(methacryloyloxy)ethyl] phosphate.

Alternatively, the ion-exchange material may be an anion-exchange polymer having quaternary ammonium groups, imidazolium groups, pyridinium groups, or salts thereof. For example, the anion-exchange polymer may be a polymer formed from the polymerization with N-trimethylaminoethylmethacrylate chloride (TMAEMC), [2-(acryloyloxy) ethyl] trimethylammonium chloride, [2-(methacryloyloxy) ethyl] trimethylammonium chloride, (3-acrylamidopropyl) trimethylammonium chloride, [3-(methacryloylamino)propyl] trimethylammonium chloride, diallyldimethylammonium chloride, (vinylbenzyl)trimethylammonium chloride, 1-vinyl-3-ethylimidazolium bromide, or 4-vinylpyridinium tribromide.

The cation- and anion-exchange polymers preferably also include cross-linkers since cross-linkers increase the strength and dimension stability of the resulting polymer. A suitable cross-linker is selected based on the polymerization chemistry required by the monomer. Examples of cross-linkers that may be used to form membranes of the present disclosure include: N,N'-methylenebis(acrylamide), N,N'-(1,2-dihydroxyethylene)bisacrylamide, N,N'-ethylenebis (acrylamide), N,N'-hexamethylenebis(methacrylamide), poly(ethylene glycol) diacrylamide, piperazine diacrylamide, 1,3-butanediol diacrylate, neopentyl glycol diacrylate, di(ethylene glycol) diacrylate, 1,3-butanediol dimethacrylate, tetra(ethylene glycol) diacrylate, tri(ethyleneglycol) diacrylate, glycerol 1,3-diglycerolate diacrylate, poly(propylene glycol) diacrylate, 1,4-butanediol diacrylate, and the cross-linkers mentioned above with respect to the exemplary polyester and polypropylene fabrics.

The ion-exchange membrane may be impregnated with ion-exchange material having an ion exchange capacity (IEC) of at least 1.6 meq/g of dry ion-exchange material. It should be understood that is the IEC is calculated without taking into account the weight of the substrate.

An ion-exchange membrane according to the present disclosure may be used in an electrolytic cell stack. Such an electrolytic cell stack could include a plurality of the ion-exchange membranes.

Figure 5:
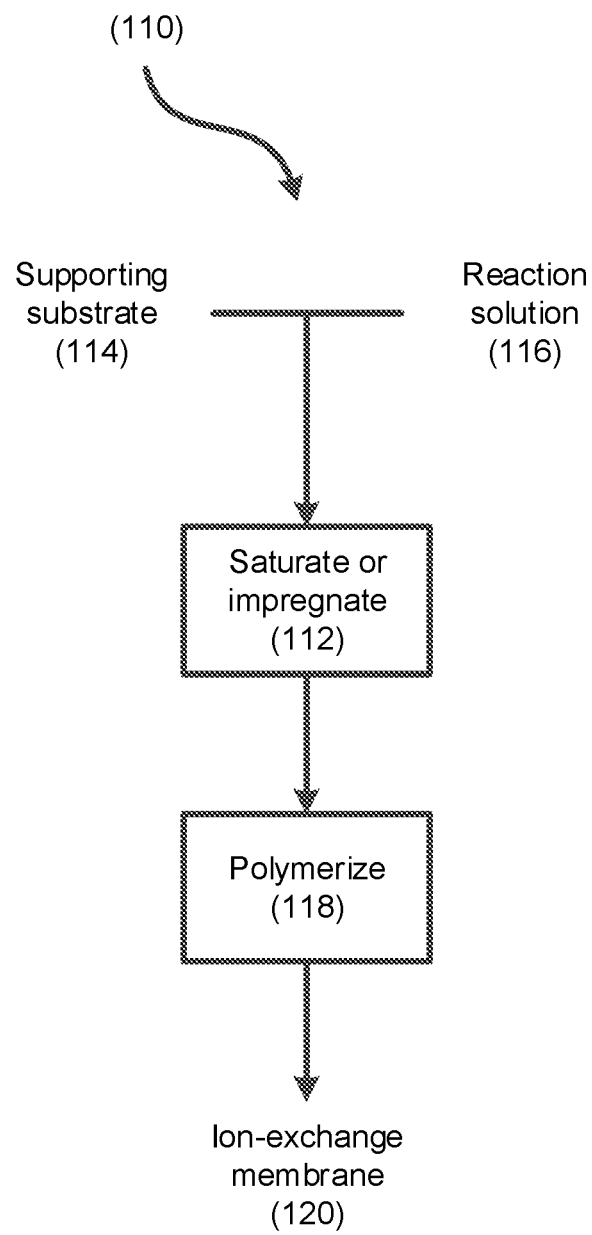
FIG. 5 is a flow chart illustration a method according to the present disclosure.

The present disclosure also provides a method of making an ion-exchange membrane. The method is illustrated in FIG. 5. The method (110) includes saturating or impregnating (112) a supporting substrate (114) having an imprinted non-woven layer, as discussed above, with a reaction solution (116) that includes an anionic or cationic monomer and a crosslinker. The imprinting includes a plurality of deformations at a surface density of at least 16 per $cm^2$. The imprinting may be embossing, debossing, or a combination thereof. The supporting substrate may lack a reinforcing layer. In some examples, the supporting substrate may include only a single layer of the imprinted non-woven fabric.

The monomer and crosslinker are polymerized (118) to form the ion-exchange membrane (120), such as at an elevated temperature or under UV initiated radical polymerization. For example, the saturated or impregnated supporting substrate may be heated at a temperature that is increased from room temperature to as high as 130° C. This increase in temperature may be effected by passing the saturated or impregnated supporting substrate over one or more heating tables that provide heating zones of increased temperatures. The heating table or tables may define a heating zone of about 20 meters long.

The anionic or cationic monomer and the crosslinker may be dissolved in a solvent, along with a radical initiator, to form the reaction solution. A skilled person would understand that a suitable solvent is one that dissolves the reagents, is unreactive under polymerization conditions, and that may be removed from the resulting membrane. Examples of suitable solvents are discussed in the examples below. The radical initiator may be a thermal initiator or a UV initiator, depending on the desired conditions for polymerization. Examples of suitable initiators are discussed in the examples below. Additional exemplary initiators are discussed in EP 3 040 365 and incorporated herein by reference.

Examples

Non-woven polyester fabrics. Seven different non-woven polyester fabrics were used to make either anion- or cation-exchange membranes. The anion-exchange membranes were made from the polymerization of N-trimethylaminoethylmethacrylate chloride (16.3 g) and ethylene glycol dimethacrylate (15.5 g) in the presence of dimethyl 2,2'-azobis(2-methylpropionate) (V-601, 0.22 g), a radical initiator. The reagents were dissolved in 18 g of dipropylene glycol (DPG). This combination of monomer and cross-linker is referred to as "AR204".

The cation-exchange membranes were made from the polymerization of 21.8 g of 2-acrylamido-2-methylpropane sulfonic acid and 26.2 g of ethylene glycol dimethacrylate in the presence of 0.8 g of V-601 (which is a polymerization initiator) and 0.005 g of mono methyl ether of hydroquinone (MeHQ) (which is a polymerization inhibitor for acrylic and acrylamide monomers). The reagents were dissolved in a solution of 2.7 g of water and 29.3 g of 1-methyl-2-pyrrolidinone (NMP). This combination of monomer and crosslinker is referred to as "CR67".

The seven polyester fabrics, all from Toray, had the following properties:

TABLE 1

| Sample No. | Deformation shape | Deformations per cm$^2$ | Unit weight (g/m$^2$) | Total thickness (μm) | Tensile strength (N/5 cm) MD | Tensile strength (N/5 cm) CD | Air permeability (cc/s/cm$^2$) |
|---|---|---|---|---|---|---|---|
| #1 | circle | 32 (4 × 8) | 28 | 180 | 120 | 30 | 200 |
| #2 | circle | 32 (4 × 8) | 43 | 200 | 210 | 95 | 120 |
| #3 | square | 100 (10 × 10) | 70 | 180 | 370 | 180 | 29 |
| #4 | diamond | 32 (4 × 8) | 40 | 160 | 165 | 85 | 175 |
| #5 | diamond | 32 (4 × 8) | 55 | 220 | 240 | 130 | 100 |
| #6 | diamond | 32 (4 × 8) | 70 | 240 | 300 | 170 | 80 |
| #7 | circle | 32 (4 × 8) | 70 | 340 | 200 | 55 | 50 |

The polyester fabrics had debossed imprints whose depths were at least 40% of the total thickness. The fabric in the debossed imprints was nearly transparent.

Cation- and anion-exchange membranes made with Sample 3 were found to be acceptably smooth and acceptably flat, with no spalling on the surface.

The following tables show various properties associated with cation- and anion-exchange membranes made with Sample 3 using four different batches of the cation- and anion-exchange polymers. The cation- and anion-exchange membranes are referred to as "CR67-PE" and "AR204-PE", respectively.

TABLE 2

| Sample | IEC (meq/g) | Water Content (%) | Water Transport (ml/F) | Permselectivity (%) |
|---|---|---|---|---|
| AR204-PE Batch 1 | 1.95 | 41.4 | 133.75 | 90.3 |
| AR204-PE Batch 2 | 1.91 | 41.1 | 127 | 89.01 |
| AR204-PE Batch 3 | 1.835 | 43.08 | 146 | 92.26 |
| AR204-PE Batch 4 | 1.88 | 43.04 | 147.5 | 91.81 |
| Average | 1.89 | 42.16 | 138.6 | 90.8 |

TABLE 3

| Sample | IEC (meq/g) | Water Content (%) | Water Transport (ml/F) | Permselectivity (%) |
|---|---|---|---|---|
| CR67-PE Batch 1 | 1.84 | 44.7 | 196.5 | 87.1 |
| CR67-PE Batch 2 | 2.1 | 46.4 | 201 | 87.3 |
| CR67-PE Batch 3 | 2.41 | 51.16 | 214 | 88.39 |
| CR67-PE Batch 4 | 1.92 | 44.14 | 197 | 88.49 |
| Average | 2.07 | 46.6 | 202.1 | 87.8 |

TABLE 4

| Sample | Resistance (Ω · cm$^2$) in 0.1N NaCl | in 0.5N NaCl | in 1N NaCl | Thickness (μm) |
|---|---|---|---|---|
| AR204-PE Batch 1 | 3.2 ± 0.08 | 2.19 ± 0.05 | 1.42 ± 0.07 | ~170 |
| AR204-PE Batch 2 | 3.4 ± 0.36 | 2.24 ± 0.09 | 1.84 ± 0.18 | ~200 |
| AR204-PE Batch 3 | 4.19 ± 0.74 | 2.51 ± 0.28 | 2.07 ± 0.23 | ~190 |
| AR204-PE Batch 4 | 3.88 ± 0.60 | 2.41 ± 0.03 | 1.76 ± 0.14 | ~170 |
| Average | 3.67 | 2.34 | 1.77 | 182 |

TABLE 5

| Sample | Resistance (Ω · cm$^2$) in 0.1N NaCl | in 0.5N NaCl | in 1N NaCl | Thickness (μm) |
|---|---|---|---|---|
| CR67-PE Batch 1 | 3.80 ± 0.20 | 3.29 ± 0.09 | 2.85 ± 0.16 | ~170 |
| CR67-PE Batch 2 | 4.36 ± 0.81 | 2.73 ± 0.26 | 2.99 ± 0.63 | ~160 |
| CR67-PE Batch 3 | 4.56 ± 0.85 | 2.18 ± 0.45 | 2.18 ± 0.33 | ~160 |
| CR67-PE Batch 4 | 5.18 ± 0.80 | 3.56 ± 0.26 | 2.52 ± 0.43 | ~170 |
| Average | 4.48 | 2.94 | 2.64 | 165 |

Ion exchange capacity (IEC) was measured by titration. Water content was calculated by [(wet weight−dry weight)/(wet weight−backing weight)]×100%. Water transport was determined by measuring the water volume that passed through the membrane when 1 Faraday of charge was applied. Permselectivity was obtained by measuring the electric potential across the membrane when a gradient of NaCl solution of 1 N over 0.5 N is used. The resistances of the membranes in a NaCl solutions were measured using a non-contact resistance measurement device. The thicknesses of the membranes were determined using a spiral micrometer.

Non-woven polypropylene fabrics. Two different non-woven polypropylene fabrics were used to make either anion- or cation-exchange membranes. The fabrics were from Toray. The anion-exchange membranes were made from the polymerization of 28.9 g of (vinylbenzyl) trimethylammonium chloride (VBTAC) and 29.7 g of divinyl benzene (DVB) in the presence of 0.9 mL of tertbutylperoxy-2-ethylhexyl carbonate (TPO), a radical initiator. The reagents were dissolved in 38.5 of dipropylene glycol (DPG). This combination of monomer and crosslinker is referred to as "AR103".

The cation-exchange membranes were made from the polymerization of 17.6 g lithium styrene sulfonate (LiSS) and 15.2 g of divinyl benzene in the presence of 0.2 g of V-601. The reagents were dissolved in 24.0 g of 1-methyl-2-pyrrolidinone (NMP). This combination of monomer and crosslinker is referred to as "CR61".

The two polypropylene fabrics, both from Toray, had the following properties:

TABLE 6

| Sample No. | Deformation shape | Deformations per cm² | Unit weight (g/m²) | Total thickness (μm) | Tensile strength (N/5 cm) MD | CD |
|---|---|---|---|---|---|---|
| #1 | oval | 64 (8 × 8) | 50 | 370 | 120 | 75 |
| #2 | square | 36 (6 × 6) | 60 | 410 | 145 | 95 |

The polypropylene fabrics had debossed imprints whose depths were at least 40% of the total thickness. The fabric in the debossed imprints was nearly transparent.

The following tables show various properties associated with cation- and anion-exchange membranes made with the two polypropylene fabrics using two different batches of the cation- and anion-exchange polymers. The cation- and anion-exchange membranes are referred to as "CR61-PP" and "AR103-PP", respectively.

TABLE 7

| Sample | IEC (meq/g) | Water Content (%) | Water Transport (ml/F) | Perm-selectivity (%) |
|---|---|---|---|---|
| AR103-PP Batch 1 | 2.10 | 36 | 115 | 92 |
| AR103-PP Batch 2 | 2.15 | 35 | 110 | 93 |
| Average | 2.13 | 35.5 | 112.5 | 92.5 |

TABLE 8

| Sample | IEC (meq/g) | Water Content (%) | Water Transport (ml/F) | Perm-selectivity (%) |
|---|---|---|---|---|
| CR61-PP Batch 1 | 2.22 | 44 | 160 | 90 |
| CR61-PP Batch 2 | 2.30 | 46 | 150 | 91 |
| Average | 2.26 | 45 | 155 | 90.5 |

TABLE 9

| Sample | Resistance (Ω · cm²) in 0.1N NaCl | in 0.5N NaCl | in 1N NaCl | Thickness (μm) |
|---|---|---|---|---|
| AR103-PP Batch 1 | 7.52 ± 0.28 | 4.66 ± 0.32 | 3.18 ± 0.27 | ~400 |
| AR103-PP Batch 2 | 8.13 ± 0.55 | 5.22 ± 0.18 | 3.56 ± 0.33 | ~500 |
| Average | 7.83 | 4.94 | 3.37 | 450 |

TABLE 10

| Sample | Resistance (Ω · cm²) in 0.1N NaCl | in 0.5N NaCl | in 1N NaCl | Thickness (μm) |
|---|---|---|---|---|
| CR61-PP Batch 1 | 7.28 ± 0.38 | 4.36 ± 0.51 | 3.01 ± 0.18 | ~400 |
| CR61-PP Batch 2 | 7.95 ± 0.23 | 5.08 ± 0.36 | 3.25 ± 0.58 | ~500 |
| Average | 7.62 | 4.72 | 3.13 | 450 |

Ion exchange capacity (IEC), water content, water transport, permselectivity, resistance, and thickness were measured as discussed above.

In the preceding description, any discussion of a range of values should be understood to disclose all possible individual values within the range and all possible ranges falling with the range. For example, a discussion of "from about 1 to about 100" should be understood to be a disclosure of every individual value from about 1 to about 100 (for example 2, 10.7, 50, 80.5, and 92) and every range that falls in the range of about 1 to about 100 (for example 10-20, 5-95, 75-80.5, and 24.3-47.5).

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides exemplary examples, it will be appreciated that modifications and variations can be effected to the particular examples by those of skill in the art. Accordingly, the scope of the claims should not be limited by the particular examples set forth herein, but should be construed in a manner consistent with the specification as a whole.

What is claimed is:

1. An ion-exchange membrane comprising:
   a supporting substrate impregnated with an ion-exchange material,
   wherein the supporting substrate comprises an imprinted non-woven layer, the imprinted non-woven layer comprising a plurality of imprinted deformations at a surface density of at least 16 per cm².

2. The ion-exchange membrane according to claim 1, wherein the non-woven layer comprises no more than 200 imprinted deformations of the plurality of imprinted deformations per cm².

3. The ion-exchange membrane according to claim 1, wherein the deformations make up from about 10% to about 90% of the surface area of the imprinted non-woven layer.

4. The ion-exchange membrane according to claim 1, wherein the imprinted deformations have an average depth that is 5-99% of the thickness of the non-woven layer.

5. The ion-exchange membrane according to claim 1, wherein the imprinted non-woven layer is an embossed non-woven layer or a debossed non-woven layer.

6. The ion-exchange membrane according to claim 1, wherein the imprinted non-woven layer has a total thickness of from about 50 μm to about 1,000 μm.

7. The ion-exchange membrane according to claim 1, wherein the deformations comprise protrusions from a single surface of the imprinted non-woven layer, or protrusions from opposite surfaces of the imprinted non-woven layer.

8. The ion-exchange membrane according to claim 1, wherein the supporting substrate has a unit weight of from about 10 g/m² to about 260 g/m².

9. The ion-exchange membrane according to claim 1, wherein the supporting substrate is a non-woven fabric sheet made of a material selected from the group consisting of polyester, polypropylene, polyethylene, polyamide, polyacrylonitrile, and polyvinyl chloride.

10. The ion-exchange membrane according to claim 1, wherein the ion-exchange material is a cation-exchange polymer having sulfonic acid groups, carboxylic acid groups, phosphoric acid groups, or salts thereof.

11. The ion-exchange membrane according to claim 1, wherein the ion-exchange material is an anion-exchange polymer having quaternary ammonium groups, imidazolium groups, or pyridinium groups.

12. The ion-exchange membrane according to claim 1, wherein the ion-exchange membrane is impregnated with ion-exchange material having an ion exchange capacity of at least 1.6 meq/g of dry ion-exchange material.

13. An electrolytic stack comprising a plurality of the ion-exchange members according to claim 1.

14. A method comprising:
combining a supporting substrate comprising an imprinted non-woven layer, the imprinted non-woven layer comprising a plurality of imprinted deformations at a surface density of at least 16 per $cm^2$, with a reaction solution comprising an anionic- or cationic-monomer and a crosslinker; and
polymerizing the monomer and crosslinker.

15. The method according to claim 14, wherein the monomer is saturated or impregnated in the supporting substrate.

16. The method according to claim 14, wherein the monomer and crosslinker are polymerized by being heated at a temperature that increases from about room temperature to about 130° C.

17. The method according to claim 14, wherein the monomer and crosslinker are polymerized under UV initiated radical polymerization conditions.

18. The method according to claim 14, wherein the reaction solution comprises an initiator, a solvent and
(a) N-trimethylaminoethylmethacrylate chloride (TMAEMC) and ethylene glycol dimethacrylate (EGDM);
(b) dimethylaminopropyl methacrylamide (DMAPMA), cyclohexanedimethanol diglycidyl ether (CHDMDGE), HCl, and N-vinyl caprolactam (V-Cap);
(c) vinyl benzyl chloride (VBC), divinylbenzene (DVB), tributyl amine (TBA), and dibutyl amine (DBA);
(d) 2-acrylamido-2-methylpropane sulfonic acid (AMPS) and EGDM;
(e) lithium styrene sulfonate (LiSS) and divinyl benzene (DVB); or
(f) (vinylbenzyl)trimethylammonium chloride (VBTAC) and DVB.

19. A supporting substrate for an ion-exchange membrane,
wherein the supporting substrate comprises an imprinted non-woven layer, the imprinted non-woven layer comprising a plurality of imprinted deformations at a surface density of at least 16 per $cm^2$.

* * * * *